(12) United States Patent
Spinella

(10) Patent No.: US 9,376,134 B2
(45) Date of Patent: Jun. 28, 2016

(54) MEDIA ENTERTAINMENT CENTER FOR STROLLERS

(71) Applicant: Sandra S. Spinella, Morristown, NJ (US)

(72) Inventor: Sandra S. Spinella, Morristown, NJ (US)

( * ) Notice: Subject to any disclaimer, the term of this patent is extended or adjusted under 35 U.S.C. 154(b) by 0 days.

(21) Appl. No.: 14/844,118

(22) Filed: Sep. 3, 2015

(65) Prior Publication Data

US 2016/0144881 A1    May 26, 2016

Related U.S. Application Data

(60) Provisional application No. 62/123,803, filed on Nov. 26, 2014.

(51) Int. Cl.
*B62B 9/26* (2006.01)

(52) U.S. Cl.
CPC .................................. *B62B 9/26* (2013.01)

(58) Field of Classification Search
CPC .... B62B 3/142; B62B 3/1408; B62B 3/1424; B62B 3/144; B62B 3/1456; B62B 3/1472; B62B 7/00; B62B 9/00; B62B 9/10; B62B 9/12; B62B 9/14; B62B 9/142; B62B 9/145; B62B 9/147; B62B 9/26
See application file for complete search history.

(56) References Cited

U.S. PATENT DOCUMENTS

| | | | | |
|---|---|---|---|---|
| 2,623,780 A * | 12/1952 | Siebert | ....................... | B62B 9/14 296/110 |
| 2,628,862 A * | 2/1953 | Packman | ................... | B62B 9/14 160/63 |
| 2,798,651 A * | 7/1957 | Wasyluk | .................... | B62B 9/14 224/553 |
| 4,072,345 A * | 2/1978 | Matsuda | ................... | A47C 7/74 297/184.1 |
| 4,939,582 A * | 7/1990 | Holdredge | ........... | A47B 23/007 348/836 |
| 5,454,584 A * | 10/1995 | Haut | ......................... | B62B 7/08 280/642 |
| 6,027,137 A * | 2/2000 | Rura | ......................... | A47C 7/66 261/DIG. 3 |
| 7,150,162 B1 * | 12/2006 | Brunner | ..................... | B62B 9/00 280/658 |
| 7,487,979 B2 * | 2/2009 | Ferraioli | ................... | B62B 9/26 280/47.25 |
| 7,891,733 B1 * | 2/2011 | Clarke | ...................... | A47C 7/62 211/118 |
| 8,479,961 B2 * | 7/2013 | Schneidau | .............. | B60R 11/02 224/409 |
| 2002/0140260 A1 * | 10/2002 | Osato | .................... | A47D 13/102 297/217.4 |
| 2005/0258673 A1 * | 11/2005 | Kassai | ...................... | B62B 9/14 297/184.13 |
| 2008/0042384 A1 * | 2/2008 | Ferraioli | ................... | B62B 9/26 280/47.38 |
| 2009/0212083 A1 * | 8/2009 | Schneidau | .............. | B60R 11/02 224/409 |
| 2011/0164779 A1 * | 7/2011 | Cassidy | ..................... | B62B 9/26 381/389 |
| 2013/0249202 A1 * | 9/2013 | White | ....................... | B62B 9/26 280/769 |
| 2014/0346207 A1 * | 11/2014 | Mccallister | ............... | B62B 9/26 224/409 |
| 2015/0175081 A1 * | 6/2015 | Rodriguez | ................ | A45F 3/02 224/600 |

* cited by examiner

*Primary Examiner* — Joseph Rocca
*Assistant Examiner* — Travis Coolman
(74) *Attorney, Agent, or Firm* — Roger M. Rathbun

(57) ABSTRACT

A media and entertainment center for baby strollers. The center can be incorporated originally into a baby stroller or retrofitted to existing baby strollers. The center includes a V-shaped pocket that extends downwardly from the shade of the stroller and has two main panels and two side panels with the main panels being joined together leaning the bottom of the V-shaped pocket. The main panel that faces the infant carried by the stroller is transparent and the side panels have perforations to allow sound to pass through the V-shaped pocket. A media device can be located within the V-shaped pocket with the viewing screen of the media device facing the transparent panel to enable the infant to see the viewing screen through the main panel and hear the sound through the side panels.

20 Claims, 7 Drawing Sheets

MEDIA ENTERTAINMENT CENTER FOR STROLLERS

CROSS REFERENCE TO RELATED APPLICATIONS

The present patent application is related to and hereby claims priority to U.S. provisional patent application filed Nov. 26, 2014 as U.S. Ser. No. 62/123,803 entitled "Media and Entertainment Center for Strollers" and the disclosure of that application is hereby incorporated herein in its entirety by reference.

BACKGROUND OF THE INVENTION

The present invention is in the technical field of baby strollers and baby carriers. More particularly, the present invention is in the technical field of using entertainment and media devices, such as mobile phones, tablets, iPADs, iPODS, DVD, MP3 and MP4 players in baby stroller and baby carriers.

Conventional baby strollers and child carriers do not provide ready-to-use means of installing and using media devices for child entertainment, education and development. Many after-market devices and holders have been developed and suggest using bulky hardware pieces such as metal tubing and clamping joints with adjustable holder positions and viewing angles. In most cases, these devices and holders require considerable skill and mechanical aptitude for installation and utilization.

SUMMARY OF THE INVENTION

The present invention is a media and entertainment center for use with baby strollers and child carriers. It is presented in two embodiments; as a prefabricated version, which can be manufactured and sold to consumers as an integral part of a stroller, and as an aftermarket kit, which can be installed on most existing strollers.

DETAILED DESCRIPTION OF THE INVENTION

Figure 1:
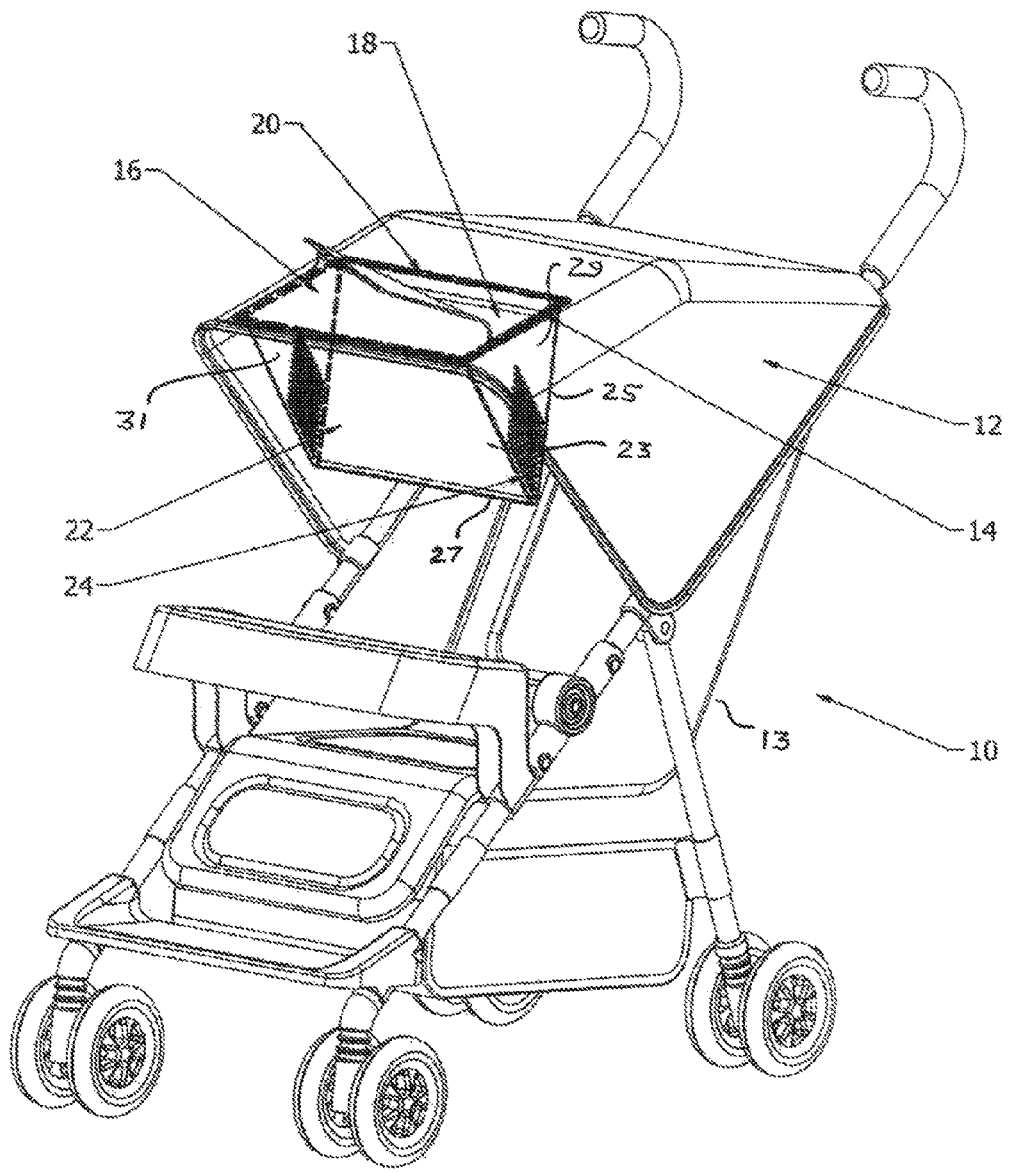
FIG. 1 is as perspective view of a generic stroller with prefabricated media center of the present invention installed thereon as first embodiment.

Referring now to the invention in More detail, in FIG. 1, there is shown a generic baby stroller 10 with a pre-fabricated version of the present invention, having a shade hood 12 with a V-shaped clear pocket 22, made out of see-through soft and durable polymer, such as PVC. The baby stroller has a stroller seat 13 to position the infant comfortable and securely in the baby stroller 10. The V-shaped pocket 22 is formed of two main panels 23, 25, oriented, respectively, front and rear, having a bottom edge 27 and two side panels 29, 31 that are triangular in shape. There are side perforations 24 formed in both the side panels 29, 31 of the V-shaped pocket 22 for audio conductivity of sound coming from a media device 18, positioned into cavity of the V-shaped pocket 22 in such a manner that the viewing screen of the media device 18 is facing a baby or child sitting in the stroller seat 13. The V-shaped pocket 22 is installed into the forward section of shade hood 12 and has a plastic or fabric overlying frame 14 that adheres the V-shaped pocket 22 to the hood 12 by an affixing method such as sewing, gluing or other means of mechanical assembly.

Overlying frame 14 has hook-and-loop strips 20, known under the trademark "Velcro" attached to at least one of its sides as a means for holding in position a flexible top cover 16 provided for protection of V-shaped pocket 22 and its content from rain, sun or other elements.

Figure 2:
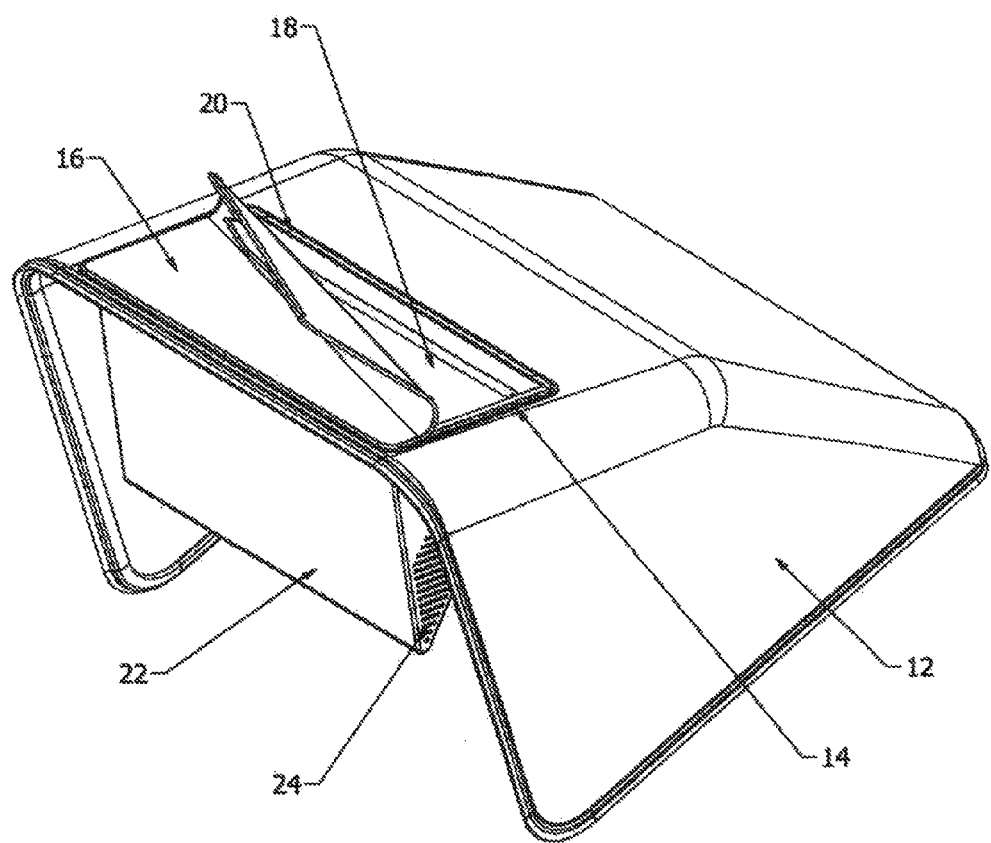
FIG. 2 is a perspective view of the stroller's shade hood with prefabricated media center of FIG. 1.

In further detail, still referring to the invention on FIG. 1, FIG. 2 shows an enlarged view of only the hood 12 with prefabricated version of present invention, having an overlying frame 14 acting as a holding means to securely attach the clear V-shaped pocket 22 to the front portion of hood 12, having hook-and-loop strips 20 attached to the upper perimeter surface of overlying frame 14 and having the flexible top cover 16, attached to the overlying frame 14 using the hook-and-loop strips 20.

V-shaped pocket 22 positions the media device 18, such as an iPad or tablet facing to the rear of the hood and slightly downwardly to provide good visibility for a child sitting in a stroller seat. V-shaped pocket 22 also has an array of perforations 24 on both side surfaces to provide audio conductivity for the media device 18 to a child. Flexible top cover 16 can be closed tightly on overlying frame 14 to provide protection for media device 18 inside V-shaped pocket 22 or flipped open partially or completely to provide access to internal cavity of V-shaped pocket 22.

The construction details of the exemplary embodiment of the present invention as shown in FIG. 1 and FIG. 2 are that parts and elements of the media center can be made of synthetic or natural fabrics, plastic polymers, metal or any combination of these materials.

Figure 3:
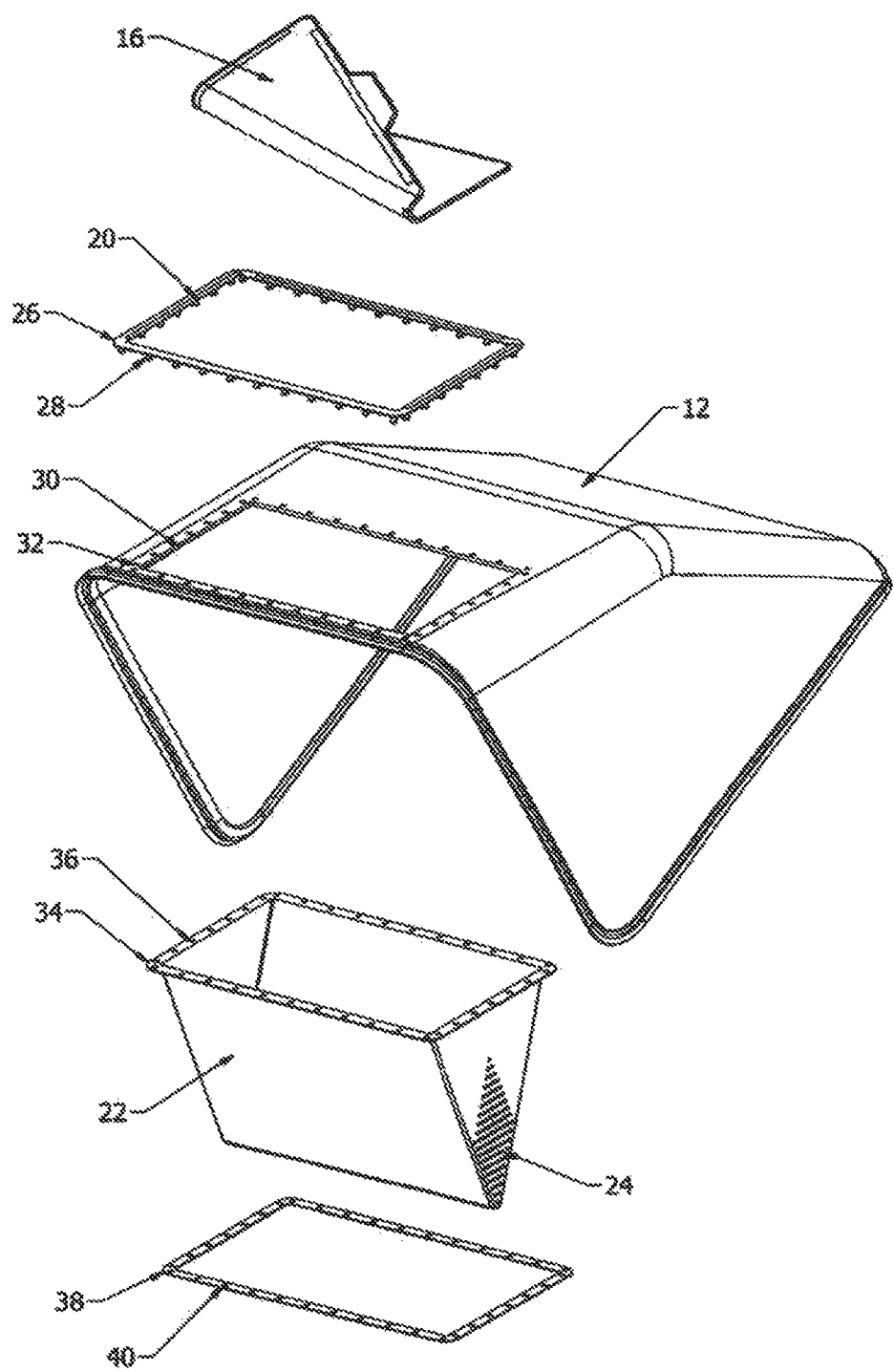
FIG. 3 is an exploded view of a second embodiment, illustrating an after-market kit version of media center installation in a hood of a generic stroller.
Figure 4:
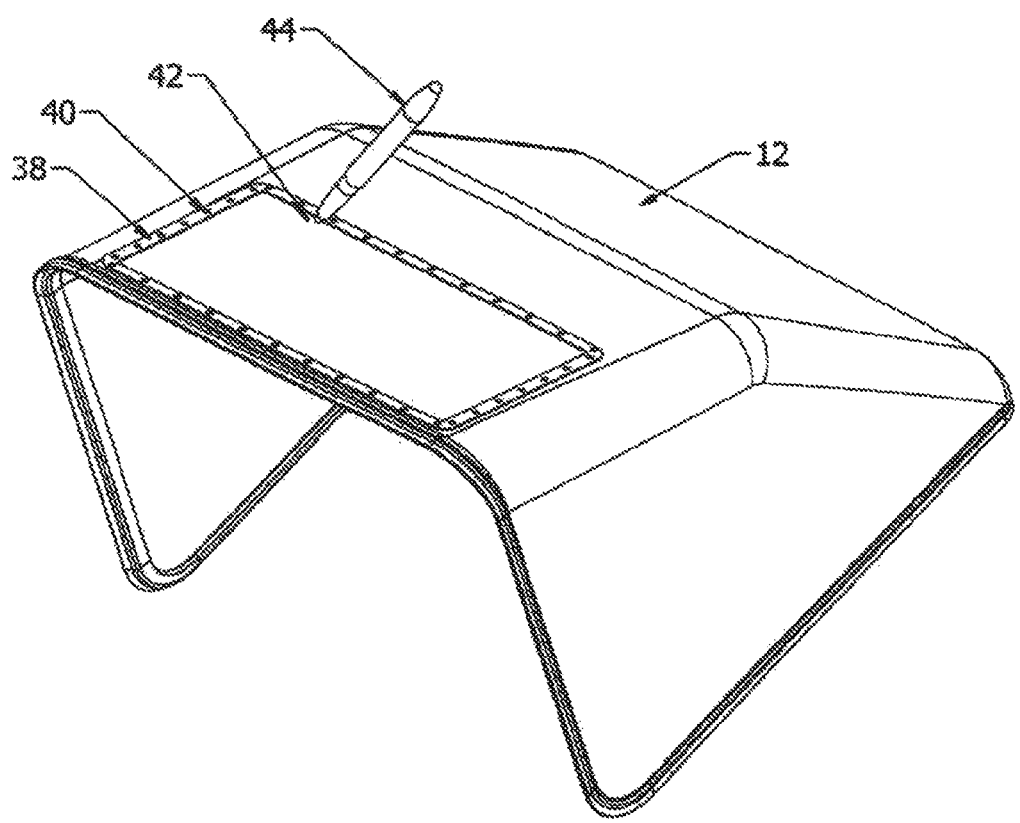
FIG. 4 is a perspective view of a first installation step of the after-market version of the FIG. 3 embodiment.
Figure 5:
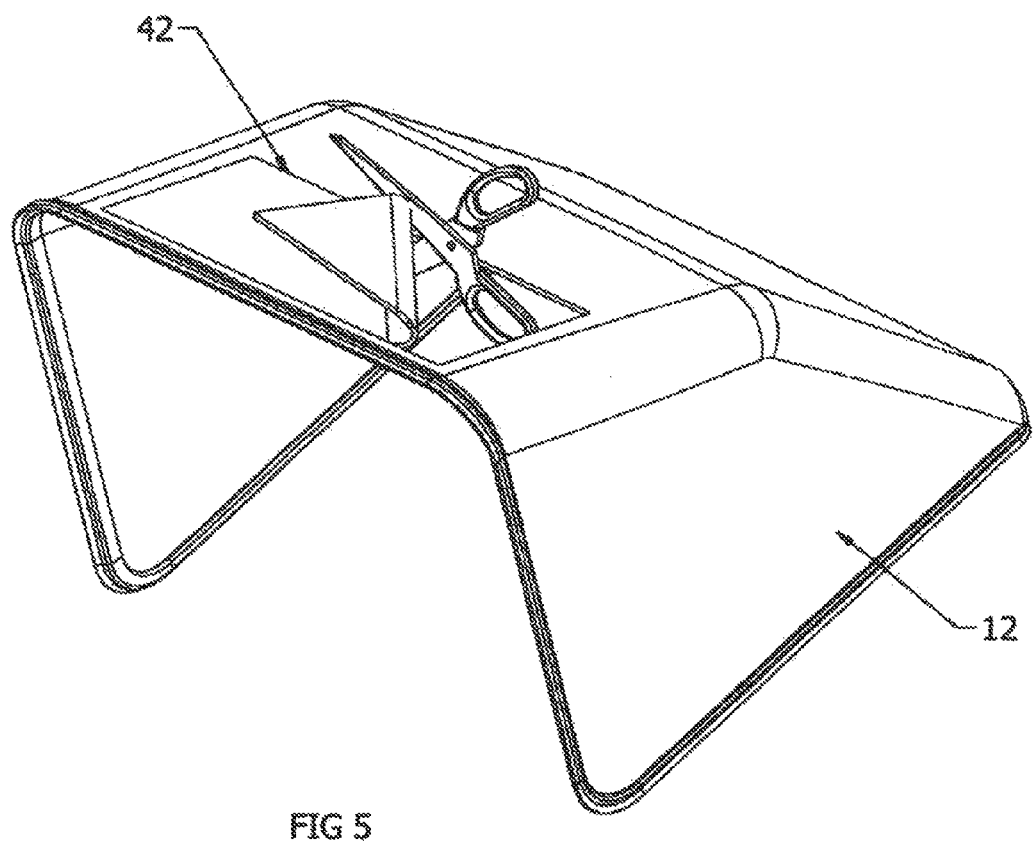
FIG. 5 is a perspective view of a second installation step of the after-market version of the FIG. 3 embodiment.
Figure 6:
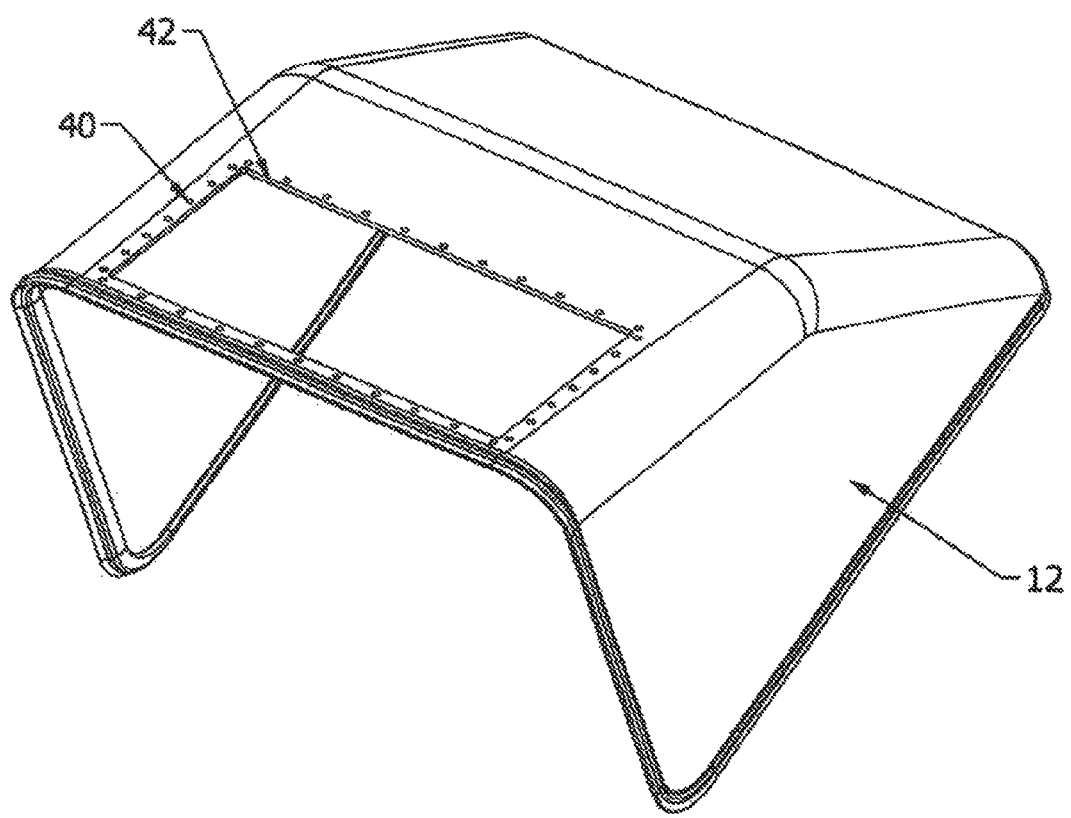
FIG. 6 is a perspective view of a third installation step of the after-market version of the FIG. 3 embodiment.

Shown in FIG. 3 is a perspective exploded view of stroller hood illustrating a second embodiment of the present invention, namely an after-market kit which can be installed on most existing strollers and child carriers with a shade hood.

As shown in FIGS. 3-6, any hood 12 of a generic stroller can be equipped with the media center described in current invention by applying an under-lining frame 38 to the top of a front section of a hood 12 and tracing inner opening outline 30 following inner edge 42 of said frame with marker 44 or similar tool, also tracing holes 40 located around perimeter of under-lining frame 38 an then cutting rectangular opening 30 with scissors or similar cutting tool and punching or cutting traced holes 32.

As next assembly step, V-shaped pocket 22 is inserted into fresh cut rectangular opening 30, and under-lining frame 38 with molded holes 40 is pressed from the under-side of the hood 12 and kit's overlying frame 26 with molded snapping pins 28 around its perimeter is pressed from the top of the hood 12 an around rectangular opening, 30 in such manner that snapping pins 28 of kit overlying flame 26 penetrate cut holes 32 in the hood fabric, penetrate corresponding holes 36 of the V-shaped pocket 22 and pass through corresponding holes 40 of under-lining frame 38, snapping and locking on the surface of under-lining frame 38, faced down.

Then hook and loop strips 20 can be applied to the top surfaces of overlying frame 26 either using glue or self-adhesive features of the hook and loop strips 20. A protective to cover 16 is then applied to the top of overlying frame 26 using the hook and loop strips 20.

Figure 7:
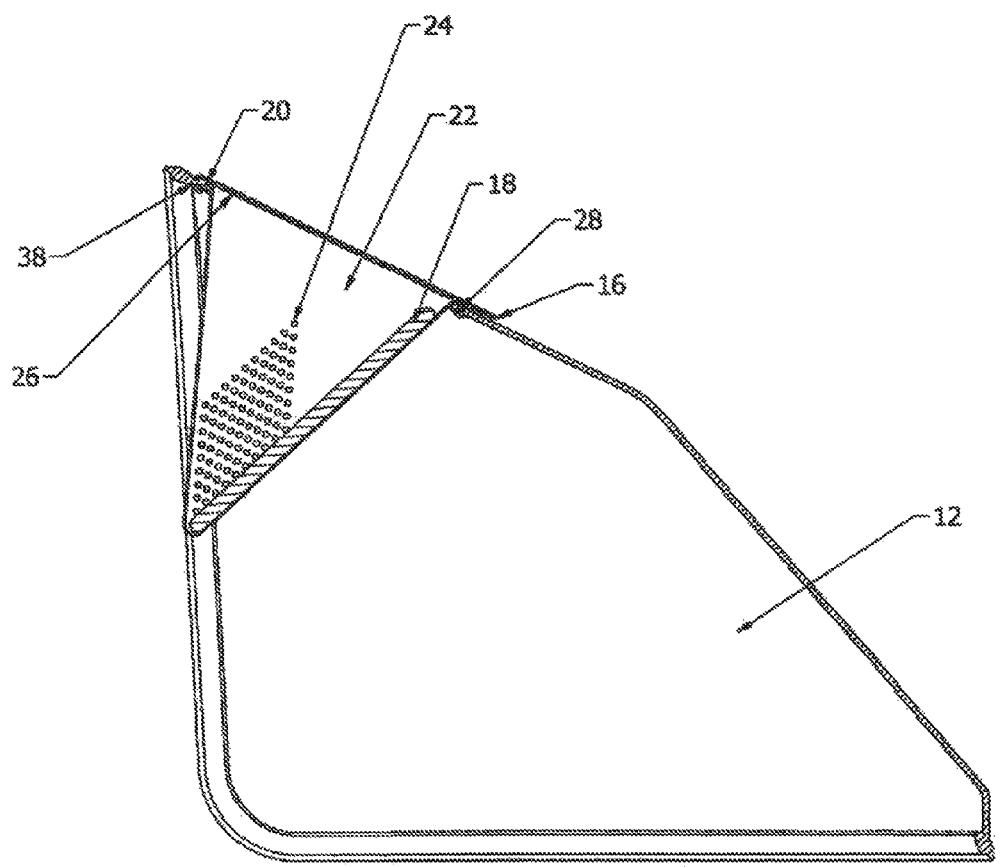
FIG. 7 is a side cross-section view illustrating an installed after-market version of the FIG. 3 embodiment.

FIG. 7 shows a side cross-sectional view of completed assembly of after-market version of present invention.

The advantages of present invention include, without limitation, that it provides an easy and inexpensive way to equip baby strollers and child carriers with a means to utilize digital media, such as tablets, mobile phones and iPod-like devices for entertaining and educating a child while sitting in the stroller seat during indoor and outdoor strolls and walks. The current invention provides a way for stroller manufacturers to equip their new models of strollers with a simple and convenient feature as well as a way to install that convenient feature on most, if not all, currently available strollers and child carriers, equipped with a shade hood, it makes it exceedingly easy to operate digital media device used with present invention and also to protect such device from the elements.

In broad embodiment, the present invention is a convenient and protective feature for using media and entertainment electronic devices in conjunction with baby strollers.

While the foregoing written description of the invention enables one of the ordinary skill to make and use what is considered presently the best mode thereof; those of ordinary skill will understand and appreciate the existence or variations, combinations and equivalents of the specific embodiments, method and examples herein. The invention should therefore not be limited by the above described embodiments, methods and examples, but by all embodiments and methods with the scope and spirit of the invention as claimed.

What is claimed is:

1. A media and entertainment center affixed to a shade of a baby stroller having a stroller seat for holding an infant, the center comprising a V-shaped pocket extending downwardly from the shade, the V-shaped pocket comprised of two main panels sealed together forming a bottom, two side panels and an upper, closable opening, at least one of the main panels facing the stroller seat and constructed of a clear material, a cover for selectively closing the upper opening, the cover being affixed to the V-shaped pocket so as to partially or fully open the opening for access to the V-shaped pocket.

2. The media and entertainment center of claim 1 wherein the upper opening has an upper perimeter surface with a closing system that cooperates with the cover for opening and closing the opening of the V-shaped pocket.

3. The media and entertainment center of claim 2 wherein the closing system has a first component of a hook and loop system along the upper perimeter surface of the opening and a second component of a hook and loop system on the cover.

4. The media and entertainment center of claim 1 wherein at least one of the side panels has perforations formed therein to allow sound to pass through the V-shaped pocket.

5. The media and entertainment center of claim 1 wherein both of the side panels has perforations formed therein to allow sound to pass through the V-shaped pocket.

6. The media and entertainment center of claim 1 wherein both main panels are transparent.

7. The media and entertainment center of claim 1 wherein the cover is transparent.

8. The media and entertainment center of claim 1 further including a media device located within the V-shaped pocket.

9. A method of installing a media and entertainment center into a baby stroller having a shade, comprising the steps of:
cutting a generally rectangular opening in the shade;
inserting a V-shaped pocket having a lower edge and an upper peripheral edge through the opening with the lower edge of the V-shaped pocket positioned downwardly;
affixing the upper peripheral edge of the V-shaped pocket to the shade centered about the opening;
affixing a removable cover to the shade to removably cover the opening.

10. The method of claim 9 wherein the step of affixing the peripheral edge of the V-shaped pocket to the shade comprises affixing an underlying frame to an interior peripheral edge of the rectangular opening and an overlying flame atop of the shade and securing the underlying frame and overlying frames together while sandwiching the interior peripheral edge of the opening there between.

11. The method of claim 10 wherein the step of affixing the peripheral edge of the V-shaped pocket securing the underlying frame and overlying frames together by inserting pins through the underlying and overlying frames to secure the underlying and overlying frames together sandwiching the interior peripheral edge of the opening therebetween.

12. The method of claim 9 wherein the step of cutting a generally rectangular opening in the shade includes the step of using a marking implement to mark along the outline of an underlying frame atop of the shade prior to the step of cutting a generally rectangular opening in the shade.

13. The method of claim 9 wherein the step of affixing a removable cover to the shade comprises affixing a strip of material having one component of a hook and loop system to an upper surface of the shade surrounding the rectangular opening.

14. The method of claim 9 further comprising the step of providing an electronic device having a viewing screen and placing the electronic device in the V-shaped pocket with the screen facing an infant positioned in the baby stroller.

15. An infant stroller for containing an infant, the infant stroller having a media and entertainment center installed thereon, the stroller having a stroller seat for supporting an infant, a V-shaped pocket extending downwardly from the shade, the V-shaped pocket comprised of two main panels sealed together forming a bottom, two side panels and an upper, closable opening, at least one of the main panels facing the stroller seat and constructed of a clear material, a cover for selectively closing the upper opening, the cover being affixed to the V-shaped pocket so as to partially or fully open the opening for access to the V-shaped pocket and a media device contained within the V-shaped pocket.

16. The infant stroller of claim 15 wherein the cover is removably affixed to the V-shaped pocket by means of a hook and loop fastening system.

17. The infant stroller of claim 16 wherein one component of the hook and loop system is provided on a rectangular frame surrounding the upper closable opening of the V-shaped pocket.

18. The infant stroller of claim 15 wherein the two side panels have perforations for allowing sound to pass through the V-shaped pocket.

19. The infant stroller of claim 15 wherein the media device has a viewing screen and the viewing screen faces the clear main panel.

20. The infant stroller of claim 15 wherein both of the main panels are transparent.

* * * * *